B. KOCK.
INTEGRATING HEAT QUANTITY METER.
APPLICATION FILED MAR. 22, 1919.

1,386,937.

Patented Aug. 9, 1921.

3 SHEETS—SHEET 1.

Inventor
B. Kock,
By H. R. Kenlake.
Attorney

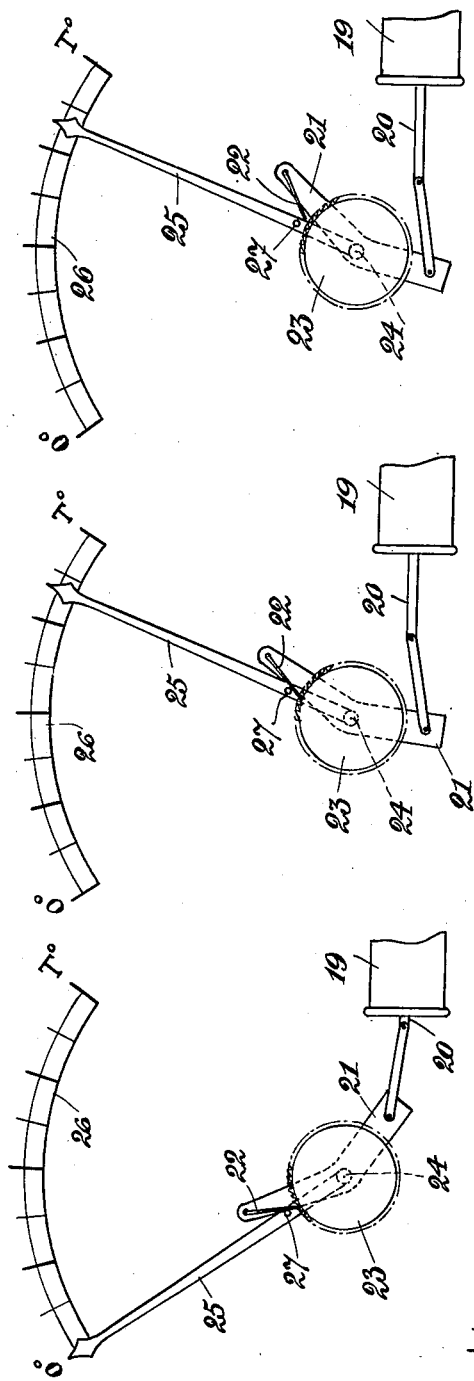

B. KOCK.
INTEGRATING HEAT QUANTITY METER.
APPLICATION FILED MAR. 22, 1919.
1,386,937.
Patented Aug. 9, 1921.
3 SHEETS—SHEET 3.
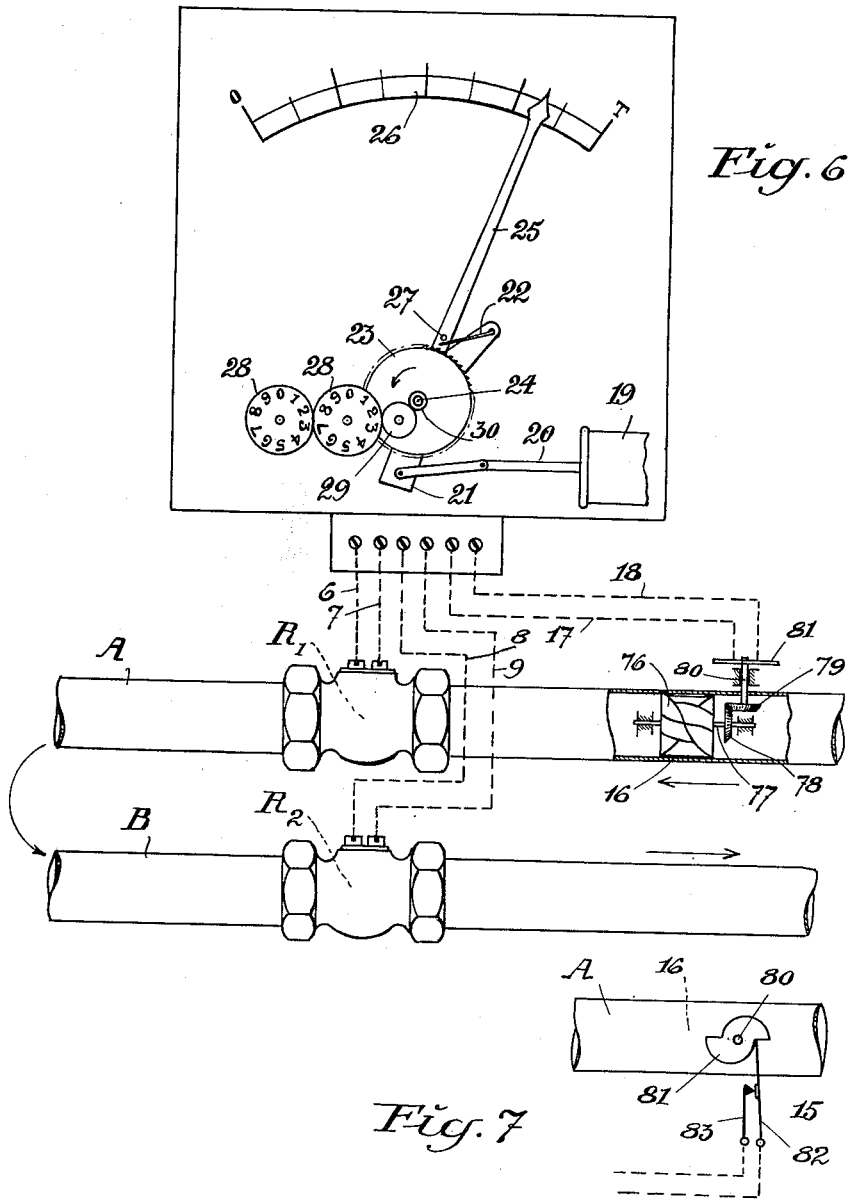
Inventor
B. Kock,
By H. R. Kerslake
Attorney

UNITED STATES PATENT OFFICE.

BIRGER KOCK, OF STOCKHOLM, SWEDEN.

INTEGRATING HEAT-QUANTITY METER.

1,386,937.            Specification of Letters Patent.         Patented Aug. 9, 1921.

Application filed March 22, 1919. Serial No. 284,336.

*To all whom it may concern:*

Be it known that I, BIRGER KOCK, subject of the King of Sweden, residing at 20 Dancmoragatan, Stockholm, Sweden, have invented certain new and useful Improvements in Integrating Heat-Quantity Meters, of which the following is a specification.

This invention relates to an integrating heat quantity meter for hot water plants and the like provided with a temperature measuring device, adapted to continually indicate the difference of temperature between the hot water supplied and that discharged, and an apparatus for measuring the water quantity passing through the pipe system.

The invention consists, chiefly, in that the temperature measuring device forms an electrical distant thermometer, the indicating member of which is combined with a device for adding intermittently the momentary value of the deflections, the said adding device being combined with the water measuring device by means of an electrical apparatus for transmission of motion so as to be mechanically independent of the water measuring device. At each time a certain quantity of water, for instance 1 cubic meter, has passed through the hot water pipe the adding mechanism is brought into function and transmits such motion to a meter as corresponds to the restoring motion of the indicating member from the position in which it indicates the momentary difference of temperature. The integrated end value constitutes a measure of the quantity of heat used.

The invention will be described more clearly below with reference to the annexed drawings showing some forms of embodiment of an integrating heat quantity meter according to this invention.

Figure 1:
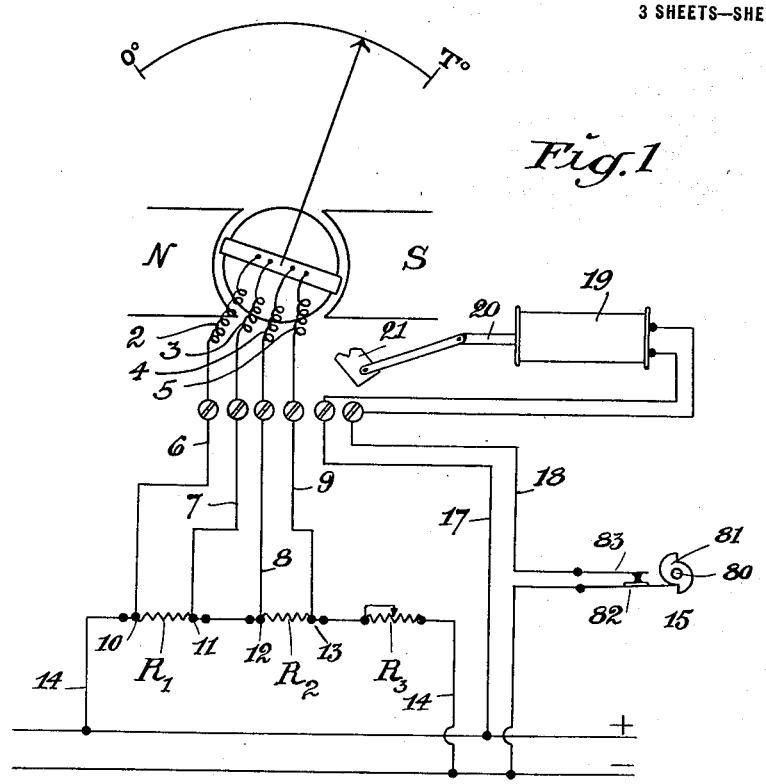
Figure 2:
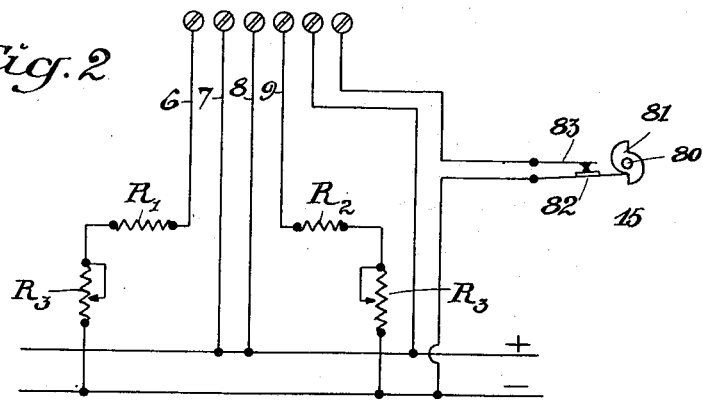

In the drawings, Figure 1 is a diagrammatical view of one form of embodiment, and Fig. 2 shows a modification of the connection of same. Figs. 3, 4 and 5 are detail views on an enlarged scale, and Fig. 6 is a diagrammatical assembly view, and Fig. 7 shows a detail belonging to the same in plan view.

Referring to the drawings, the distant thermometer shown, consists of a galvanometer, the moving system of which placed between the north-pole N and the south-pole S of a magnet is provided with two reacting windings or coils 2—3 and 4—5. According to Fig. 1, the winding 2—3 is by means of lines 6 and 7 connected in parallel with the end points 10, 11 of a resistance $R_1$ arranged in the supply pipe A (Fig. 6). The winding 4—5 is connected in an analogous manner by means of lines 8 and 9 in parallel with the end points 12, 13 of a resistance $R_2$ arranged in the discharge pipe B. The resistances $R_1$ and $R_2$ and a calibration resistance $R_3$ are connected to a lighting net-work through the line 14. To the said lighting net-work is also connected a circuit breaker 15, which is by suitable means (not shown) acted on by the water quantity meter 16 (Fig. 6) for each cubic meter of water that has passed through the said meter. As an example of suitable constructions of the water quantity meter and the circuit breaker Figs. 6 and 7 show a rotary device 76 located within the supply tube A on a shaft 77 and so constructed that it is brought to rotate by the water supplied through the tube. On this shaft is keyed a bevel gear 78 meshing with a bevel gear 79 on a shaft 80. On the opposite end of this shaft being located outside the tube A is keyed an S-shaped disk 81. Against the circumference of this disk is applied a spring 82, which can establish contact with another spring 83 only in the position of the spring 82 which is shown in Fig. 7 and in the corresponding position when the disk has rotated half a revolution. In other positions of the disk during the rotation of the same the spring 82 is held out of contact with the spring 83. It is thus only during the short moments when the springs 82, 85 are in contact with one another that the circuit 17, 18 is closed. Connected in the circuit 17, 18 is an electromagnet 19, the armature 20 of which is coupled to the one arm of an angle lever 21, Figs. 3–5. Arranged on the other arm of the angle lever 21 is a spring 22 which can be brought, like a pawl, into engagement with the teeth of a ratchet wheel 23 rotatably mounted on a shaft 24. Arranged on the said shaft is also the pointer 25 of the distant thermometer, the said pointer being movable over a scale 26. On said pointer is a pin 27 or other abutment which, on movement of the lever 21 from the position in Fig. 5 to the position in Fig. 4, presses the spring 22 down into engagement with the teeth of the wheel 23 (position according to Fig. 4). Fig. 5 shows the starting position in which spring 22 is out of engagement with the pin 27. Fig. 3 shows the position in which the pointer has been brought back to the zero position.

In Fig. 1, the resistance $R_3$ is so large with relation to the resistances $R_1$ and $R_2$ that if the voltage of the lighting net-work is constant, the intensity of the current in the circuit 14 can be regarded as constant, in spite of change in the resistances $R_1$ and $R_2$ on account of the differences of the temperature. When the windings of the distant thermometer are connected in parallel with the resistances $R_1$ and $R_2$, as shown in Fig. 1, and the said resistances are connected in series, the current passing through the windings 2—3 and 4—5 will be proportional to the voltage drop between the end points 10, 11 and 12, 13, respectively, of the resistances, and, thus, proportional to the temperatures of the resistances. If the temperature be the same in the pipes A and B, containing the resistances $R_1$ and $R_2$, and if, consequently, no difference of temperature exists between the resistances, the actions of the two reacting windings 2—3 and 4—5 will neutralize each other and the pointer 25 will be retained in the zero-position. If on the other hand a difference of temperature exists in the supply pipe and the discharge pipe, and, thus, the temperature of $R_1$ is higher than that of $R_2$, the voltage drop between the points 10 and 11 will be larger than the voltage drop between the points 12 and 13, which entails that a stronger current passes through the winding 2—3 connected to the resistance $R_1$. The pointer 25 will thus make a deflection on the scale 26 proportional to the difference of temperature in the pipes A and B.

When now for instance 1 cubic meter of water has passed through the meter 16, the circuit breaker 15 will be acted upon so as to close for a moment the circuit 17, 18. The electromagnet 19 hereby attracts its armature 20, the lever 21 being thereby turned. The spring 22 is hereby first brought into engagement with the pin 27 of the pointer 25 and is bent downward by the said pin and brought into engagement with the teeth of the ratchet wheel 23, (Fig. 4) and simultaneously the lever 21 acts on the pin 27 so that the pointer will be moved back to the zero-position (Fig. 3) and the spring 22 will rotate the wheel 23 in the direction of the arrow through a certain angle corresponding to the deflection of the pointer, i. e. to the difference of temperature. Hereby also the register wheels 28 (Fig. 6) meshing with the wheel 29 rotated by the wheel 30 on the shaft 24, will be rotated to a corresponding degree and the quantity of heat used can be read off directly on the said wheels 28.

According to the modification shown in Fig. 2, the windings of the distant thermometer are connected in series with the resistances $R_1$ and $R_2$, respectively, and the two circuits 6—7 and 8—9 are connected in parallel to the lighting net-work. In this case two calibration resistances $R_3$ are used. The said device acts as to the rest in the same manner as does the device shown in Fig. 1.

Obviously, the forms of embodiment shown may be changed as to the connections as well as with regard to the construction of the different members used without departing from the spirit and scope of the invention. Thus, for instance, instead of the distant thermometer of the kind shown having resistances $R_1$ and $R_2$ a thermocouple element of any known construction may be used. If a device according to Fig. 1 be used the galvanometer may be of another construction than that shown.

Having thus described my invention, what I claim is:

1. In an integrating heat quantity meter for hot water plants and the like, the combination with a temperature measuring device comprising thermoresponsive means exposed to the flowing hot water to continually indicate the difference of temperature between the hot water supplied and that discharged, of a meter for measuring the quantity of water passing through the pipe system, the said temperature measuring device being an electrical distant thermometer, the indicating member of which is combined with means for adding intermittently the momentary value of the deflections, and the said adding means being combined with the water meter by means of an electrical device for transmission of motion so as to be mechanically independent of the water meter, in order that at each time a certain quantity of water has passed through the meter, the said adding means may be brought into action and the integrated end value may constitute a measure of the heat quantity used.

2. A heat quantity meter according to claim 1, in which the water meter is combined with a circuit breaker arranged in a line (17, 18) connected to a source of current, an electrical releasing device (19, 20, 21) for the adding means being connected to the said line in such manner that, at each time a certain quantity of water has passed through the meter, the latter closes the contact device and thereby brings the adding means into action.

In testimony whereof I have affixed my signature in presence of two witnesses.

BIRGER KOCK.

Witnesses:
AXEL EHRNER,
GRETA PRIEN.